Figure 1:
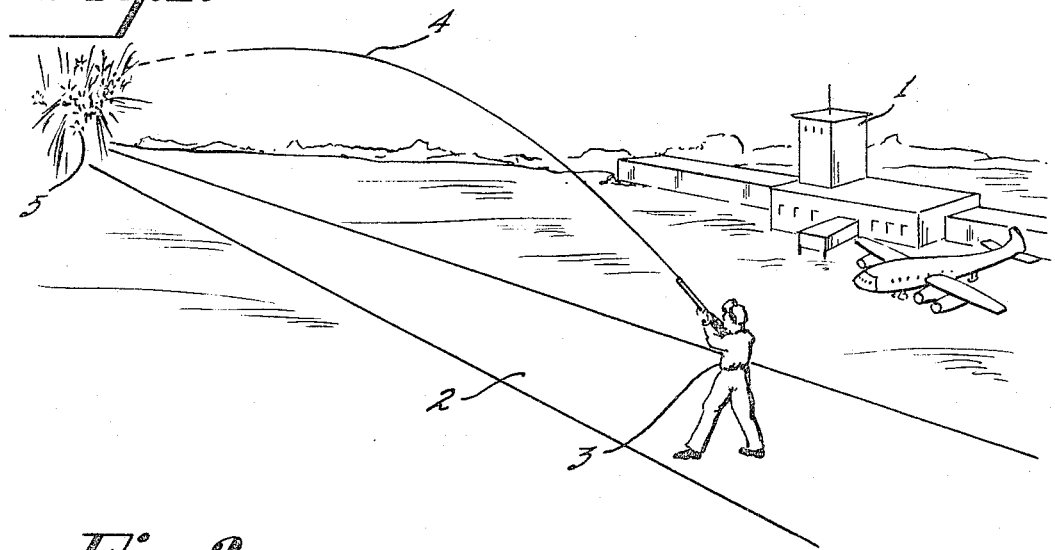

June 6, 1967 B. ROTHMAN 3,323,456

CARTRIDGE HAVING FLASH AND NOISE PROJECTILE

Filed Aug. 9, 1965

INVENTOR.
Barry Rothman
BY
ATTORNEY.

United States Patent Office 3,323,456
Patented June 6, 1967

3,323,456
CARTRIDGE HAVING FLASH AND NOISE
PROJECTILE
Barry Rothman, West Chester, Pa.
(138 Church St., Malvern, Pa. 19355)
Filed Aug. 9, 1965, Ser. No. 478,140
9 Claims. (Cl. 102—37.6)

This invention relates to shotgun ammunition, and particularly to a shotgun cartridge capable of exploding with a loud noise and a flash after a time interval following its discharge from the shotgun.

It is well known that farm crops are subject to much destruction by wild animals, and particularly birds. In recent years, too, flocks of birds roosting on or adjacent to airport runways have been responsible for serious accidents, especially in the case of jet engine propelled airplanes, when the planes take off and the birds are drawn into the engines and cause them to fail. The increased hazard of birds and other animals on jet runways, and the more or less wholesale destruction of crops by avian predation have resulted not only in great financial losses through property damage, but even in loss of life itself.

Various solutions have been proposed heretofore in attempts to solve this problem. Among these is the use of exploding ammunition discharged from shotguns in the general direction of the roosting birds, or other animals which tend to gather in areas where they are not wanted, in order to frighten them off. However, shotgun cartridges heretofore available have suffered from one or more disadvantages. For example, some of them are of limited range. Hence, when using such cartridges, one may find it necessary to approach fairly close to the destructive wild life, thus scaring them away by the approaching person rather than by the explosion of the cartridge, so that the effectiveness of the cartridge is largely lost. To increase the range of such cartridges, various propellant gunpowders have been used, but such powders are usually of a highly corrosive nature and therefore shorten the life of the shotguns from which they are shot. In some cases, too, the cartridges are so constructed that, even if shot from a distance, they produce pellets or the like which are apt to kill the dispersing birds or other animals. This usually not only violates game laws, but it creates the nuisance of thereafter having to remove the bird or other animal remains.

The primary object of the present invention is to provide an improved shotgun carriage which is highly useful for the purpose of effectively scaring off and dispersing birds and other animals from areas to be protected, yet which is not subject to the aforementioned and other disadvantages of prior art cartridges used for this purpose.

More particularly, it is an object of this invention to provide an improved shotgun cartridge as aforesaid which will afford quick and economical control of wild life at areas to be protected, and which will do so irrespective of weather conditions.

Another object of this invention is to provide an improved, explosive type of shotgun cartridge which has superior ballistic characteristics and a much greater range than similar cartridges of the prior art.

Still another object of this invention is to provide an improved shotgun cartridge as above set forth which will have a relatively long range without the use of highly errosive and corrosive materials and which, therefore, will not subject the shotguns in which they are used to serious damage in a relatively short time.

Yet another object of this invention is to provide an improved shotgun cartridge which has not only extra- ordinary range, but also great accuracy by reason of its inherent ballistic properties.

A further object of this invention is to provide an improved shotgun cartridge which, while capable of producing a flash and a loud noise upon exploding, is free from any dangerous fragments apt to kill, or even seriously injure, the wild life to be dispersed.

A still further object of this invention is to provide an improved shotgun cartridge of the type described which is safe to handle.

Another object of this invention is to provide, in an explosive type of shotgun cartridge, an improved fuse retaining device which will insure much greater safety to the shooter by greatly reducing the chances of bore or muzzle bursts.

It is also an object of this invention to provide an improved shotgun cartridge as aforesaid which is simple in construction, easy and comparatively safe to manufacture, economical in cost, and highly reliable and efficient in operation.

In accordance with one form of this invention, the cartridge comprises a tubular, outer casing, preferably of heavy paper or light cardboard, which is seated tightly at one end within, and is closed off at that end by, a correspondingly tubular, cup-like base shell of metal. Within this shell, the casing encloses a chamber which is preferably only partly filled with a charge of smokeless propellant powder. The shell has a percussion primer in communication with the propellant powder, the primer being disposed to be struck by the firing pin of a shotgun to be ignited thereby in known manner. The aforementioned chamber is closed off at its forward end by a wad of flexible material, such as a plastic, disposed within the casing in spaced relation to the propellant powder whereby to leave a free space between the propellant powder and the wad. This wad is of dished or cupped form to provide a piston-like, closed, front end and a skirt which extends rearwardly from the closed end and lies against the inner surface of the casing for a purpose shortly to be set forth.

Forwardly of the aforementioned wad within the outer casing is a projectile assembly. This assembly comprises an elongated, tubular cup of paperboard or the like which is coaxial with the casing and preferably slightly spaced from the inner surface thereof. One end of this tubular cup is closed and preferably abuts the plastic wad, although it may be spaced slightly from the wad by a paperboard or similar washer, if desired. Within the tubular cup and disposed on or against the closure at the closed end thereof is a ballistic mass or weight which provides much greater range for the discharged projectile than in the case of prior art cartridges. Forwardly of this ballistic weight within the tubular cup is a chamber filled with a pyrotechnic payload, such as a fire cracker powder adapted to explode with a loud noise and preferably also produce a flash of light. The pyrotechnic payload and the ballistic weight are sealted within the elongated cup in preferably firm relation with each other by a sealing member, preferably also of paperboard, adjacent the forward end of the tubular cup. A cardboard sealing disk is disposed transversely within the casing and bears against the forward end of the tubular cup to hold the latter firmly against the platsic wad. This sealing disk is preferably also made of cardboard and is held in place against the tubular cup within the casing by reversely bending the forward, open end portion of the casing within itself and against the sealing disk, and crimping the inverted end in place.

Extending through the plastic wad, the closed end of the tubular cup and the ballistic from the propellant powder containing chamber to the pyrotechnic payload is at least one relatively slow burning delay fuse. More than one such fuse may be employed, if desired. This fuse is embedded in the ballistic weight in a manner hereinafter more particularly described and serves as an ignition coupling between the propellant powder and the firecracker powder.

When the firing pin of a shotgun strikes the primer, it causes the priming mixture in the primer to ignite in known manner to, in turn, ignite the propellant powder. The ballistic weight permits the use of smokeless powder instead of the customary black powder or mixtures of black and smokeless powder heretofore necessary due to the poor ballistic coefficients of prior projectiles. Thus, erosion and corrosion of the gun bores is minimized. The smokeless powder may be any one of a number of smokeless nitrocellulose-base gunpowders adapted for use in small arms ammunition and readily available on the market. When this smokeless powder ignites, gases are generated therefrom within the aforementioned chamber. These generated gases spread the rearwardly extending skirt of the plastic wad against the inner surface of the cartridge to thereby seal in the gas pressure and prevent gas blow-by, or bleeding off of the gases, which would impair, if not even defeat, proper ballistic performance as in many prior art cartridges. The pressure of the generated, thus trapped or confined gasses cause the closed, forward end of the flexible wad to discharge the projectile assembly with piston-like action and relatively greater force than in the case of prior art cartridges. This alone helps to increase the range of the projectile; and the range is even further increased by the inertia of the ballistic weight. At the same time, the loose fuse end within the aforesaid propellant powder-containing chamber becomes ignited. As the discharge projectile advances along its trajectory, the fuse continues to burn forwardly along its length until it finally ignites the firecracker powder in the palyoad. This causes the projectile to explode with a loud noise and simultaneously produce a flash of light, both of which will effectively frighten and disperse the unwanted wild life.

The fuse is preferably timed to ignite the firecracker powder after an interval of about 3 seconds. During this interval, the projectile assembly will have traveled a distance of two hundred yards or more depending, in part, upon the angle from the horizontal at which the shot is fired. Thus, the shooter need not approach close to the birds or other animals to be dispersed and thereby scare them off only very briefly. On the contrary, experience has shown that birds frightened off by an exploded cartridge of the type described will remain away for a comparatively long time. The explosion of the projectile destroys the paper or cardboard materials used in the cartridge, and it shatters the combination ballistic weight and fuse retainer into only very small fragments or particles of debris incapable of killing or inflicting serious injury to birds or other animals that may be struck thereby.

Figure 2:
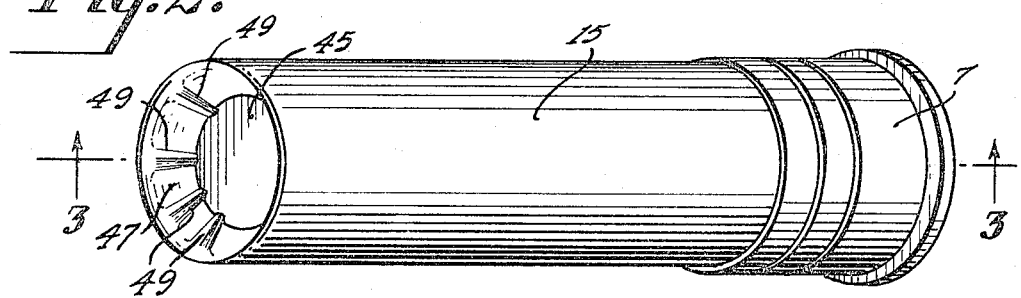
Figure 3:
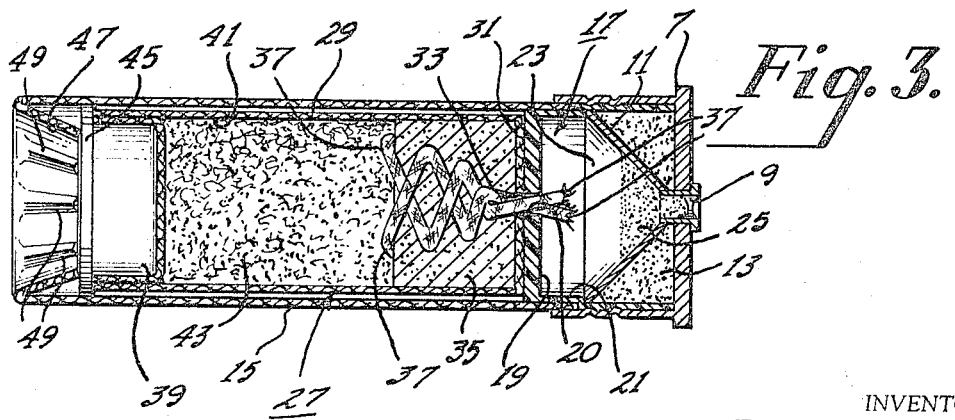

The novel features of this invention, both as to its organization and manner of operation, as well as additional objects and advantages thereof, will be understood more readily from the following description, when read in connection with the accompanying drawing in which:

FIG. 1 is a pictorial view illustrating the use of a cartridge according to this invention along the runway of an airport, FIG. 2 is a perspective view of one form of assembled cartridge according to the present invention, and FIG. 3 is a longitudinal, sectional view thereof taken along the line 3—3 of FIG. 2.

Referring more particularly to the drawing, there is shown, in FIG. 1, an airfield with a terminal building 1 and an elongated runway 2 along which a flock of birds may gather and roost at a distance from the terminal building, thus presenting a hazard to airplanes taking off from the runway. To frighten and disperse such birds, a person 3 holding a shotgun loaded with cartridges according to the present invention, and stationed some distance from the birds, can fire upwardly into the air at a suitable angle and in the general direction of the birds. The discharge projectile, moving along the trajectory 4, for example, will explode with a loud noise and preferably also with a flash 5 after about three seconds following its discharge, during which time it will have travelled some 200-300 yards by reason of the novel features of the cartridge hereinafter described in detail. The combined noise and flash will immediately frighten off the birds, and experience has shown that they are not apt to return to this location, or even to the vicinity thereof, for at least a day after being frightened off in this manner, and perhaps even for a longer time.

As shown in FIGS. 2 and 3, the cartridge may comprise a cup-like base shell 7 which is closed at one end and which carries a conventional percussion type primer 9 at this closed end. The shell 7 may also include a cone shaped member 11 which extends in forwardly diverging manner from percussion cap of the primer 9 and which is backed by any suitable base wad material 13. Since base shells of this type are well known in the art, no further description thereof is believed necessary.

Tightly fitted into the shell 7 at one end thereof is a normally open-ended, tubular casing 15 of heavy paper or light cardboard. Thus, the shell 7 acts as a closure for that (the rear) end of the casing 15. Within the casing 15 in proximity to the shell 7 is a wad or cap member 17 of flexible material. The wad 17 is preferably molded from a low density polyethylene plastic which is flexible at room temperature, but any suitable material which is flexible may be used. In any case, the wad or cap 17 has a disk 19 of substantially the same outer diameter as the inside diameter of the casing 15, the disk 19 serving to close the front end of the wad except for a small, substantially central hole 20 therein, as clearly shown in FIG. 3, and also to act in piston-like fashion, as will be explained more fully hereinafter. Integral with the disk 19 and extending rearwardly therefrom along the inner surface of the casing 15 is a circumferential flange or skirt 21 for a purpose shortly to be more fully described.

The wad 17 cooperates with the cone shaped member 11 to provide a chamber 23, the skirt 21 extending rearwardly into that chamber. Within the chamber 23 is a charge of propellant powder 25. Heretofore, it has been customary to use either black powder alone or a mixture of black powder and smokeless powder as the propellant in order to obtain sufficient force to discharge the projectile suitably and because of the poor ballistic coefficient of prior art projectiles. Such powders are known to produce a high degree of corrosion in the gun bores and thus greatly shorten the lives of the guns. With the cartridge of the present invention, however, a smokeless powder can be used for a reason shortly to be apparent. Any one of a number of smokeless nitrocellulose-base gunpowders adapted for use in small arms ammunition, and readily available on the market, may be used. Such smokeless powders subject the guns to minimum corrosion, and gun life is therefore greatly increased when cartridges with smokeless gunpowder propellants are employed, as in the present invention.

Forwardly of the wad 17 within the casing 15 is a projectile assembly 27. This assembly includes an elongated, tubular cup 29 which is also made of heavy paper or thin cardboard and preferably fits loosely within the casing 15. The cup 29 is closed at its rear end by a closure disk 31 which preferably abuts the wad disc 19 and has a substantially central hole 33 therethrough in substantial alignment with the hole 20 in the disc 19. Disposed within the tubular cup 29 against the closure disk 31 is a mass or ballistic weight 35 which serves to impart to the projectile assembly, in flight, a relatively high inertia to aid in extending the range of the projectile. The mass 35 is preferably formed of a cold pressed mixture of powdered lead and zinc, lead having a density of approximately 11 to 12, and zinc a density of approximately 7, which enables the mass 35 to act as an effective ballistic weight. The mass 35 also acts as a retainer for one or more fuses 37 which will be referred to more particularly hereinafter. Two such fuses are shown merely by way of example, since any number of fuses from one to several may be used. A cup-like projectile seal 39, also made of heavy paper or the like, extends into the tubular cup 29 from the forward end thereof a short distance to form, with the cup 29 and the mass 35, a chamber 41 in which a charge of explosive powder 43 is disposed. The cup 39 may be cemented to the interior surface of the tubular cup 29 to provide a good seal. The explosive powder 43 is preferably any suitable firecracker powder which, when ignited, explodes with a loud noise and emits a bright flash of light. This firecracker powder may be considered as the pyrotechnic payload of the projectile assembly. Since the explosive powder 43 is in powder form, it is of much lighter weight and has a much lower density or specific gravity than the cold pressed metallic mixture of which the ballistic weight 35 is formed. In other words, the mass 35, having an appreciably greater density and weight than the explosive powder 43, can act effectively as a ballistic weight to impart to the projectile assembly a higher flight coefficient and thus extend the range of the projectile.

Forwardly of the tubular cup 29 within the casing 15 is a cardboard sealing disk 45 which bears against the forward end of the casing 15 to hold the projectile assembly 27 firmly against the plastic wad disk 19. To accomplish this, the forward end portion 47 of the casing 15 is reversely bent inwardly within itself to bring the extreme end thereof snugly against the sealing disk 45, and the portion 47 is formed with crimps 49 to hold it in this position.

The fuses 37, which may be standard firecracker, safety type fuses of well known form, are preferably pressed into the mass 35 during formation thereof. These fuses extend from the mass 35 rearwardly through the holes 33 and 20 into the chamber 23 where their rear ends may either be loose or, if desired, in contact with the propellant powder 25, although the latter is not really necessary. At their forward ends, however, the fuses should preferably be in firm contact with the explosive firecracker powder 43.

In the use of a cartridge such as described above, when the firing pin of a shotgun strikes the primer 9, the priming mixture thereof is ignited. The ignited priming mixture thereupon ignites the propellant powder 25 and the latter generates, within the chamber 23, hot gases which spread and press the skirt 21 of the plastic wad 17 tightly against the inner surface of the tubular casing 15, thereby effectively sealing in the gas pressure by preventing the gases from by-passing the wad 17 between its skirt 21 and the casing 15. The gas pressure thus sealed in acts forcefully against the closure disk 19 of the wad 17 to cause it to act in piston-like fashion against the projectile assembly 27 and force the projectile assembly 27 more forcefully out of the cartridge and the bore of the gun. Concurrently, the ignited propellant powder 25 ignites the fuse ends in the chamber 23. The fuses 37 are preferably of such length as to burn for about three seconds. Because of the relatively greater force applied by the sealed-in, hot gases generated in the chamber 23, the projectile assembly is given a greater starting impulse than was attainable in prior art cartridges with the same quantity of propellant powder. Moreover, once the projectile assembly is in flight along its trajectory, the inertia of the ballistic weight or mass 25 will carry it a much greater distance than was heretofore achieved. Thus, in about three seconds, the projectile of the cartridge of the present invention will have travelled from 200 to 300 yards or even more in some cases. At the end of the three second interval, the fuses 37 will ignite the firecracker powder 43 which will then explode with a loud noise and a bright flash to disperse the unwanted birds or other animals which may have gathered along the runway 2. Similar use of the cartridge of this invention can, of course, be made on farms to minimize destruciton of crops by avian predation.

From the foregoing description, it will be apparent that there has been provided, by the present invention, an improved shotgun cartridge which has a number of advantages over prior art cartridges of the same type. Whereas heretofore known cartridges could not employ smokeless propellant powder effectively because of the poor ballistic coeffcients of their projectiles, the incorporation of the mass 35 in the projectile of the present invention makes the use of smokeless powder entirely feasible and practical. The use of smokeless powder greatly reduces damage to guns by corrosion. Moreover, by incorporating the fuses 37 in the mass 35, much greater safety is provided to the shooter because this fuse retaining system greatly reduces chances of bore or muzzle bursts. In addition, as pointed out heretofore, the range of the projectile is increased greatly by reason of (1) the sealing-in of the gases generated by the propellant powder, (2) the piston-like action of the disk 19 which helps to discharge the projectile more effectively, and (3) the inertia of the ballistic weight or mass 35, which helps to carry the projectile a greater distance in a given time, so that the shooter need not approach the wild life to be dispersed as closely as was necessary heretofore.

Although only a single embodiment of the invention has been described herein, it will undoubtedly be apparent to those skilled in the art that other forms thereof, as well as variations in that described, all coming within the spirit of this invention, are possible. It is desired, therefore, that the foregoing shall be taken merely as illustrative and not in a limiting sense.

What is claimed is:

1. In an explosive type of shotgun cartridge, the combination comprising
    (1) a tubular casing, and
    (2) a projectile assembly within said casing, said assembly comprising
        (a) an elongated, tubular cup closed at its rear end,
        (b) a mass of metal having a density range of approximately 7 to 12 comprising a ballistic weight within said cup at said closed end thereof for imparting to said projectile assembly a relatively high inertia in flight whereby to impart to said assembly a relatively long range,
        (c) means spaced from said mass to provide a chamber within said cup,
        (d) a charge of explosive firecracker powder in said chamber, said metal mass having a greater density than said firecracker powder, and
        (e) ignitable fuse means retained by said metal mass and extending therealong into contact with said powder for igniting said powder to cause it to explode.

2. The combination set forth in claim 1 wherein said metal mass comprises a cold pressed mixture of lead and zinc.

3. The combination set forth in claim 1 wherein said metal mass comprises a cold pressed mixture of powdered lead and zinc, and wherein said fuse means is embedded in said cold pressed mixture.

4. An explosive type of shotgun cartridge comprising, in combination,
    (1) a cup-like base shell including percussion priming means adapted to be ignited upon being struck by the firing pin of a gun, (2) a tubular casing having one end disposed in said shell and closed at said end by said shell,
(3) wad means within said casing in proximity to said shell providing a first chamber,
(4) a projectile assembly within said casing forwardly of said wad means, said assembly comprising
   (a) an elongated, tubular cup closed at its rear end,
   (b) a mass of metal having a density range of approximately 7 to 12 comprising a ballistic weight within said cup at said closed end thereof adapted to impart to said projectile assembly a relatively high inertia in flight whereby to impart to said assembly a relatively long range,
   (c) means spaced from said mass to provide a second, closed chamber within said cup, and
   (d) a charge of ignitable, relatively light weight, firecracker powder in said second chamber, said metal having a greater density and weight than said firecracker powder,
(5) an ignitable propellant powder charge in said first chamber capable of generating gases under pressure when ignited, said priming means being in communication with said propellant powder charge to ignite said propellant powder upon being itself ignited whereby to cause said propellant powder to generate said gases for discharging said projectile assembly from said casing, and
(6) fuse means retained by said metal mass in communication with said first chamber, said fuse means extending along said mass to said explosive firecracker powder charge and being adapted to be ignited in response to ignition of said propellant powder and to burn along its length to, in turn, ignite said explosive firecracker powder after a time delay following discharge of said projectile assembly to cause said firecracker powder to explode at the end of said time delay.

5. The invention set forth in claim 4 wherein said metal mass is disposed against said closed end of said elongated, tubular cup, and wherein said tubular cup closed, rear end is in abutting relation with said wad means.

6. The invention set forth in claim 5 wherein said ignitable propellant powder comprises only a smokeless powder.

7. The invention set forth in claim 4 wherein said metal mass comprises a cold pressed mixture of lead and zinc.

8. The invention set forth in claim 4 wherein said metal mass comprises a cold pressed mixture of powdered lead and zinc, and wherein said fuse means comprises at least one fuse element embedded in said cold pressed mixture, said fuse element having a loose end extending rearwardly into said propellant powder charge containing chamber.

9. The invention set forth in claim 4 wherein said metal includes zinc.

References Cited
UNITED STATES PATENTS

| | | | |
|---|---|---|---|
| 2,582,124 | 1/1952 | Holmes | 102—42 |
| 3,026,801 | 3/1962 | Oberfell | 102—42 |
| 3,062,144 | 11/1962 | Hori et al. | 102—38 |
| 3,093,073 | 6/1963 | Lockwood et al. | 102—42 |

SAMUEL W. ENGLE, *Primary Examiner.*

ROBERT F. STAHL, BENJAMIN A. BORCHELT,
*Examiners.*

UNITED STATES PATENT OFFICE

CERTIFICATE OF CORRECTION

Patent No. 3,323,456                                                               June 6, 1967

Barry Rothman

It is hereby certified that error appears in the above numbered patent requiring correction and that the said Letters Patent should read as corrected below.

Column 1, line 67, for "errosive" read -- erosive --; column 2, line 57, for "sealted" read -- sealed --; line 70, after "ballistic" insert -- weight --; column 3, line 26, for "cause" read -- causes --; column 3, line 34 and column 4, line 6, for "discharge", each occurrence, read -- discharged --; column 4, line 23, after "from" insert -- the -- ; column 6, line 9, for "destruciton" read -- destruction --; column 7, line 17, after "weight," insert -- explosive --.

Signed and sealed this 2nd day of January 1968.

(SEAL)
Attest:

Edward M. Fletcher, Jr.                                          EDWARD J. BRENNER
Attesting Officer                                                     Commissioner of Patents